United States Patent Office 2,988,559
Patented June 13, 1961

2,988,559
ORGANIC FLUORINE COMPOUNDS AND METHOD OF PREPARATION
Eric R. Larsen, Midland, Mich., assignor to The Dow Chemical Company, Midland, Mich., a corporation of Delaware
No Drawing. Filed Dec. 7, 1959, Ser. No. 857,546
13 Claims. (Cl. 260—408)

This invention relates to organic chemistry, and is more particularly concerned with new fluorinated acids and esters and the preparation thereof.

The literature discloses a number of methods of preparing fluorinated acids and esters, however, none of these methods are completely satisfactory for the preparation of a variety of acids and esters ranging from those containing only two fluorine atoms α to the carboxy group to those that are essentially perfluorinated. Also, none of these procedures satisfactorily provides a bromine substituted at least gamma to the carboxy group in such fluorinated acids and esters.

It is an object of the present invention to provide a variety of new fluorinated acids and esters, ranging from those containing only two fluorine atoms α to the carboxy group to those that are essentially perfluorinated.

It is another object to provide a method of making a variety of new fluorinated acids and esters of any desired chain length, ranging from 4 to 14 or more carbon atoms, which introduces the carboxy group directly into the final compound, thus avoiding difficulties encountered in other methods.

Still a further object is the provision of such fluorinated acids and esters containing a bromine gamma to or more remote from the carboxy group. Other objects will become apparent hereinafter.

The process of the present invention includes contacting a 1-alkene containing up to 12 carbon atoms and selected from the group consisting of 1-alkenes, chloro-substituted 1-alkenes, fluoro-substituted 1-alkenes, and chlorofluoro-substituted 1-alkenes, with a fluorinated ester of the type $CF_2BrCO_2R$, where R may be any lower alkyl group, i.e. containing from 1 to 6 carbon atoms, in the presence of a free radical addition catalyst and at elevated temperature and pressure, and separating the ester product or hydrolyzing said product with aqueous acid to produce the corresponding fluorinated acids. While a peroxide catalyst, such as, for example, di-tertiary-butyl peroxide, benzoyl peroxide, or diacetyl peroxide, is generally used, other free radical addition catalysts or energizers such as actinic or gamma radiation, or heat may be employed. Alkene-1 starting materials which are suitable include, for example, ethylene; propene-1; decene-1; 1,1-dichloroethylene; 7-chloroundecene-1; hexafluoropropene-1; 4,6,8-trifluorononene-1; and 1,2,3,3,4,6-hexachloro-1-fluoropentene-1. Appropriate ester starting materials include, for example, methyl bromodifluoroacetate, propyl bromodifluoroacetate, butyl bromodifluoroacetate, pentyl bromodifluoroacetate and hexyl bromodifluoroacetate. The temperature of the reaction will depend on the length of chain desired and the decomposition temperature of the catalyst used, and may vary from about 75° to about 200° C. With di-tertiary-butyl peroxide temperatures of 100°–150° C. are preferred, and from 110° to 130° are desirable. The pressure may be atmospheric or above, and is usually autogenous. Separation of the product is accomplished by distillation, solvent extraction or other means suitable for the particular reaction product.

The process of the present invention may be further illustrated, but is not to be construed as limited, by the following examples.

Example I

A heavy-walled, glass ampule was charged with 61.5 grams of $CF_2BrCO_2C_2H_5$, 3.5 grams of di-tertiary-butyl peroxide and 17 grams of hexene-1. The ampoule was cooled, evacuated, sealed, and heated in an oil bath at 120–130° C. for 3 hours. The contents of the ampoule were then removed and fractionated. Distillation under a reduced pressure of 2 millimeters of mercury absolute yielded 20 grams of ethyl gamma-bromo-α,α-difluorooctanoate, $CH_3(CH_2)_3CHBrCH_2CF_2CO_2C_2H_5$, boiling at 85° C. at 2 millimeters of mercury pressure absolute. Its index of refraction, $N_D^{25}$, is 1.4331, and its density, $D_4^{25}$, is 1.286. This corresponds to a conversion of 35.6 percent and a yield of 60.5 percent based on the hexene-1.

Example II

A heavy-walled, glass ampoule was charged with 46 grams of $CF_2BrCO_2C_2H_5$, 52 grams of octene-1 and 2 grams of benzoyl peroxide. The ampoule was heated in a water bath at 100° C. for 6 hours, and the contents removed and fractionated. Distillation under a reduced pressure of 0.8 millimeter of mercury absolute yielded 25 grams of ethyl gamma-bromo-α,α-difluorodecanoate, $C_6H_{13}CHBrCH_2CF_2CO_2C_2H_5$, boiling at 105–107° C. at 0.8 millimeter of mercury pressure absolute. Its index of refraction, $N_D^{25}$, is 1.4391, and its density, $D_4^{25}$, is 1.226. This corresponds to a conversion of 35 percent.

In addition, 20 grams of pot residue were obtained having a boiling point in the vicinity of 400° C., which analysis indicated to be ethyl 5-bromo-α,α-difluoro-3-hexyl undecanoate,

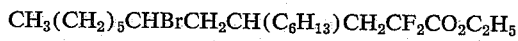

$CH_3(CH_2)_5CHBrCH_2CH(C_6H_{13})CH_2CF_2CO_2C_2H_5$

Example III

A heavy-walled, glass ampoule was charged with 60 parts of $CF_2BrCO_2C_2H_5$, 23 parts of $CF_2{=}CFCl$, and 1.5 parts of di-tertiary-butyl peroxide, sealed and heated in an oil bath at 110–130° C. for 4 hours. Distillation of the ampoule contents yielded 4 parts of viscous liquid having a boiling range from 120° C. at 760 millimeters of mercury pressure absolute to 120° C. at 1 mm. of mercury pressure absolute. Infrared analysis showed this mixture to be esters of the type $Br(CFClCF_2)_nCF_2CO_2Et$, with an average value of $n=2.4$. The mixture contained a major proportion of ethyl 5-bromo-3,5-dichlorooctafluorovalerate, $BrCFClCF_2CFClCF_2CF_2COOC_2H_5$.

Distillation of the pot residue gave 3 parts of material having a boiling range of 120° C. at 1 millimeter of mercury pressure absolute to 200° C. at 0.5 millimeter of mercury pressure absolute. Infrared analysis showed this material to be esters of the type $Br(CFClCF_2)_nCF_2CO_2Et$, with an average value of $n=5.5$ and containing a major proportion of ethyl 11-bromo-3,5,6,9,11-pentachloroheptafluoroundecanoate,

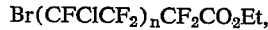
$BrCFClCF_2CFClCF_2CFClCF_2CFClCF_2$
$CFClCF_2COOC_2H_5$

In a manner similar to that of the foregoing examples, other fluorinated esters containing bromine may be prepared, such as, for example, methyl 4-bromo-2,2-4,4-tetrafluorobutyrate by reacting methyl bromodifluoroacetate with 1,1-difluoroethylene; methyl 6-bromo-4,6-dichloro-2,2,3,4,5,6-hexafluorohexanoate by reacting 1-chloro-1,2-difluoroethylene with methyl bromodifluoroacetate; methyl 4-bromo-2,2-difluorobutyrate by reacting ethylene with methyl bromodifluoroacetate; methyl 6-bromo-4,4,6,6-tetrachloro-2,2,3,3,5,5-hexafluorohexanoate by reacting methyl bromodifluoroacetate with 1,1-dichloro-2,2-difluoroethylene; butyl 4-bromo-5-chloro-2,2-difluorovalerate by reacting 3-chloropropene-1 with butyl bromodifluoroacetate; propyl 4-bromooctafluorovalerate by reacting hexafluoropropene-1 with propyl bromodifluoroacetate; ethyl α,α-difluoro-gamma-bromotetradecanoate by reacting dodecene-1 with ethyl bromodifluoroacetate; hexyl 6-bromo-2,2,4,4,6,6-hexafluorohexanoate by reacting hexyl bromodifluoroacetate with 1,1-difluoroethylene; and butyl-6-bromo-4,6-dichloro-2,2,3,4,5,6-hexafluorohexanoate by reacting 1-chloro-1,2-difluoroethylene with butyl bromodifluoroacetate. All of these esters are readily converted to the corresponding acid by treatment with an aqueous mineral acid.

The compounds of the present invention are useful as surfactants and emulsifiers and in treating cloth to obtain hydrophobic and oleophobic properties.

Various modifications may be made in the present invention without departing from the spirit or scope thereof, and it is to be understood that I limit myself only as defined in the appended claims.

What is claimed is:
1. Ethyl gamma-bromo-α,α-difluorooctanoate.
2. Ethyl gamma-bromo-α,α-difluorodecanoate.
3. Ethyl 5-bromo-α,α-difluoro-3-hexylundecanoate.
4. Ethyl 5-bromo-3,5-dichloro-octafluorovalerate.
5. Ethyl 11-bromo-3,5,7,9,11-pentachloro-heptafluoro-undecanoate.
6. A method of making new fluorinated compounds which includes contacting a 1-alkene containing up to 12 carbon atoms and selected from the group consisting of 1-alkenes, chloro-substituted 1-alkenes, fluoro-substituted 1-alkenes, and chlorofluoro-substituted 1-alkenes, with a fluorinated ester of the type $CF_2BrCO_2R$, wherein R is a lower alkyl group, in the presence of a free-radical addition catalyst and at a temperature from about 75° to about 200° C. and under at least atmospheric pressure.
7. A method of making new fluorinated compounds which includes contacting a 1-alkene containing up to 12 carbon atoms and selected from the group consisting of 1-alkenes, chloro-substituted 1-alkenes, fluoro-substituted 1-alkenes, and chlorofluoro-substituted 1-alkenes, with ethyl bromodifluoroacetate in the presence of a free-radical addition catalyst and at a temperature from about 75° to about 200° C. in a closed vessel and under autogenous pressure, and separating the product.
8. A method of making new fluorinated esters which includes contacting a 1-alkene containing up to 12 carbon atoms and selected from the group consisting of 1-alkenes, chloro-substituted 1-alkenes, fluoro-substituted 1-alkenes, and chlorofluoro-substituted 1-alkenes, with ethyl bromodifluoroacetate in the presence of di-tertiary butyl peroxide and at a temperature from about 75° to about 200° C. in a closed vessel and under autogenous pressure, and separating the product.
9. A method of making new fluorinated esters which includes contacting a 1-alkene containing up to 12 carbon atoms and selected from the group consisting of 1-alkenes, chloro-substituted 1-alkenes, fluoro-substituted 1-alkenes, and chlorofluoro-substituted 1-alkenes, with ethyl bromodifluoroacetate in the presence of benzoyl peroxide and at a temperature from about 75° to about 200° C. in a closed vessel and under autogenous pressure, and separating the product.
10. A method of making ethyl gamma-bromo-α,α-difluoroacetanoate which includes contacting hexene-1 with ethyl bromodifluoroacetate in the presence of di-tertiary butyl peroxide at a temperature from about 120° to about 130° C. in a closed vessel under autogenous pressure and thereafter separating the product by distillation.
11. A method of making ethyl gamma-bromo-α,α-difluorodecanoate and ethyl 5-bromo-α,α-difluoro-3-hexyl undecanoate which includes contacting octene-1 with ethyl bromodifluoroacetate in the presence of benzoyl peroxide at a temperature of about 100° C. in a closed vessel under autogenous pressure and thereafter separating the products by distillation.
12. A method of making ethyl-5-bromo-3,5-dichloro-octafluorovalerate and ethyl-11-bromo-3,5,7,9,11-pentachloroheptafluoroundecanoate which includes contacting chlorotrifluoroethylene with ethyl bromodifluoroacetate in the presence of di-tertiary butyl peroxide at a temperature from about 110° to about 130° C. in a closed vessel under autogenous pressure and thereafter separating the products.
13. A compound of the group consisting of alkyl bromofluoroalkanoic acids and esters having the formula

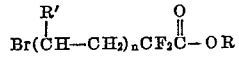

wherein R is an alkyl group containing from 1 to 6 carbon atoms, R' is a member of the group consisting of hydrogen and alkyl group containing from 1 to 6 carbon atoms, and $n$ is an integer from 1 to 8.

References Cited in the file of this patent

Lovelace et al.: Aliphatic Fluorine Compounds, pages 240, 211 and 214 (1958), A.C.S. Monograph No. 138, Reinhold Pub. Co., New York, N.Y.